June 5, 1951  J. F. LEE  2,555,593
TESTING APPARATUS FOR GAUGE LINES
Filed May 17, 1947
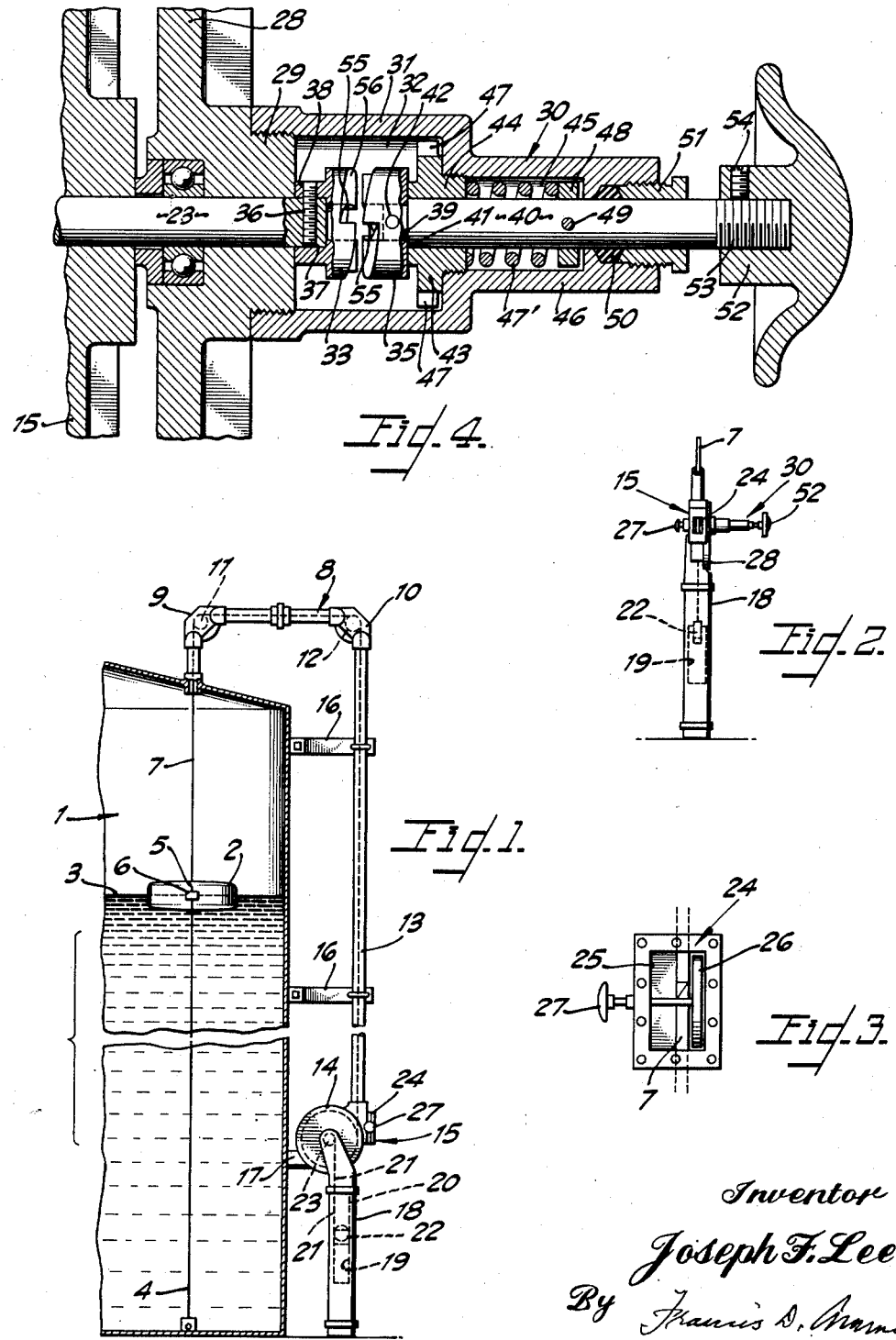
Inventor
Joseph F. Lee,
By Francis D. Warren
His Atty.

Patented June 5, 1951

2,555,593

UNITED STATES PATENT OFFICE 2,555,593

TESTING APPARATUS FOR GAUGE LINES

Joseph F. Lee, Lynwood, Calif., assignor to Frank V. Long, Compton, Calif., doing business under the name of The Vapor Recovery Systems Company Application May 17, 1947, Serial No. 748,716

5 Claims. (Cl. 73—321)

This invention relates to gauging apparatus that employs a guided line, or tape, as part of the apparatus.

Gauge apparatus of this type is used for various specific purposes, and in the present specification, the invention is described as applied to a gauge apparatus for use as an accessory on storage tanks for liquids. In gauge apparatus of that type, the gauge line, or tape, suspends a float which rests on the surface of the liquid in the tank, and this gauge line, or tape, passes up through the roof of the tank, or out through the bottom, or side, of its shell. This tape is guided around guide rollers in a conduit that extends over to one side of the tank. If the tape passes out through the roof of the tank, then it is guided down at the side of the tank to a point near the ground, where the gauge line or tape is carried on a take-up reel. If the tape passes out through the bottom or shell of the tank, it is still connected up to the apparatus at, or about, the ground level where readings indicating the level of the liquid, may be observed.

On account of the erosive action, or other causes, it sometimes happens that scale or accumulations of small particles in the vicinity of the guide rollers, may cause them to jam in such a way as to interfere with the free running of the tape. On this account, gauging apparatus of this kind is sometimes provided with an accessory device located at the point where the gauge tape is read, and which is provided with means to impart slight movements to the tape when desired, to indicate whether the tape is running free. Such testing apparatus is also employed to "jiggle" the float on the surface of the liquid, up and down at times, to overcome surface tension of the float's side surface area to insure that the indications on the tape at the reading-box, give an accurate indication of the level of the liquid.

When moving the tape to ascertain whether it is running freely on its guide rollers, it should be moved only in the direction which will raise, or tend to raise the float above the liquid level. In some cases, if the tape is badly jammed, or stuck at some point along its path, it may require a considerable pull on the tape to dislodge it and loosen it up. One of the objects of this invention is to provide testing apparatus for the purpose stated, through which a positive torque force can be imparted to the take-up roller, in a direction to take up the tape slightly, and indicate whether it is running freely; and to construct this apparatus in such a way that it can not impart a torque force to the tape, in a direction which would develop slack in the coils of the tape on the take-up reel.

In accomplishing the above purposes, another object is to provide means capable of being used when desired, to effect connection to the shaft of the reel, but which is normally out of contact or operative connection with the same, to the end that the presence of the testing device will not affect the proper operation of the tape, and accuracy of its indications at the sight-box.

Further objects of the invention will appear hereinafter.

The invention consists in the novel parts and combinations of parts to be described hereinafter, all of which contribute to produce an efficient testing apparatus for gauge lines.

A preferred embodiment of the invention is described in the following specification, while the broad scope of the invention is pointed out in the appended claims.

In the drawing:

Fig. 1 is a side elevation and partial section illustrating apparatus with which this testing apparatus is used. This view is broken away at about mid height on the tank, a portion of which is shown in vertical section.

Fig. 2 is a side elevation of the housing and support for the take-up reel as viewed from the right side of Fig. 1, and showing the upper portion of the conduit broken away, that houses the tape as it passes up from the reel. This view indicates the position of the reading-box through which the tape can be read, and also illustrates my testing apparatus secured to the side of the reel housing.

Fig. 3 is a front elevation of the reading-box upon an enlarged scale, and indicating the portion of the gauge tape which is visible through the transparent plate or cover of the reading-box.

Fig. 4 is a longitudinal vertical section taken through the axis of the testing apparatus (shown at the right in Fig. 2), and this view also shows a portion of the cover of the reel housing in section, and also illustrates adjacent parts, including the end of the reel shaft.

My invention is applicable in any situation which involves the use of means for effecting movements of a gauge line corresponding to changes of level of the liquid. In the present specification the invention is described as applied to a common type of tank and gauge line the movements of which are controlled through the agency of a float to which the gauge line is attached.

Before proceeding to a more detailed description of this invention, it should be stated that in practice I provide manually controlled means operatable at will for effecting a positive driving connection to the reel on which the body of the tape is wound, the parts being so constructed that the reel can only be rotated in a direction that will lift the float at the surface of the liquid in the tank. By raising the float slightly and letting it fall back to its floating level in the tank, the tester ascertains whether the tape is running freely over its guides. This connection is so constructed that if it is attempted to rotate the reel in a direction that would unwind the tape, no movement will be imparted to the reel.

Referring now particularly to the parts, 1 indicates a tank in which a liquid is stored, and in which a float 2 is provided, that floats on the surface 3 of the liquid. The float 2 is guided on two sides by guide wires such as the guide wire 4, which is indicated as broken off at 5 above one of the two guide lugs 6 that project laterally from the side of the float. The float is suspended on a gauge line, preferably in the form of a graduated tape 7 that passes up through a conduit 8 made of piping, including corner fittings 9 and 10 which connect up to short lengths of piping, and which house small guide rollers 11 and 12 around which the tape passes, in order to reach the down-take or long leg 13 which extends down and connects to the housing 14 of the take-up reel 15. The take-up reel carries coils of the tape, and is biased to rotate in a direction to maintain the tape in a taut condition. This long leg 13 is suitably supported on arms 16 that are attached to the side wall of the tank. The reel housing is usually supported on a suitable brace bracket 17 from the side of the tank, and also on a stand or post 18 that extends up from the ground, and houses a tension apparatus including a counterweight 19 which is suspended in a loop, one end of which is anchored at 20, and the other end 21 of which extends up and wraps upon a small pulley 22 that is rigid on the shaft 23 of the take-up reel.

At the front of the housing 14 a reading-box or light-box 24 is provided, through which the graduations on the tape 7, are visible through the transparent cover 25. The housing 14 adjacent to the light-box, may be provided with a wiper 26 that can be wiped across the inner side of the plate 25, by means of a knob 27, in order to clear the inside of the glass, if that becomes necessary.

When applying my invention to gauge apparatus such as described, I prefer to provide the housing 14 with a cover 28 on one side, such as the right side as indicated in Fig. 2, and this cover 28 is preferably provided with a threaded boss 29, or other means to facilitate attachment of the housing 30 of the testing apparatus.

The inner end of the housing 30 is enlarged to form a bell 31, the inner end of which is threaded to enable it to be screwed onto the threaded boss 29. Within the bell 31 a clutch chamber 32 is formed, in which the operating clutch for the reel shaft 23 is located. This clutch includes a driven clutch member 33, which is rigidly secured to the end of the shaft 23 and a driving clutch member 35.

In order to secure the driven clutch member 33 to the shaft 23, I may provide the end of the shaft with a diametrically disposed set screw 36 that passes through one wall of a socket 37 formed in the rear side of the clutch member 33 to receive the end of the shaft 23. The forward end of the set screw 36 thrusts against the inner face of the wall of the socket 37 on the side thereof that is opposite to the opening 38 in the socket wall through which the set screw 36 enters. This set screw runs free in the opening in the socket wall, but is threaded in the opening in the shaft 23 that receives it.

The clutch member 35 is secured on a tip 39 formed on the inner end of the actuating shaft or spindle 40, through the agency of which the shaft 23 is to be rotated. The outer face of the clutch member 35, therefore, seats against an annular shoulder 41, and in order to impart torque to it, it is secured to the reduced neck or pintle 39 by a diametrically placed tapered pin 42.

The shaft 40 at its inner end is rotatably mounted in a bearing, which is in the form of a bushing 43 that is connected into place by a threaded bushing 44 received in screw threads formed in the outer end of a spring chamber 45 that lies within the reduced outer portion or neck 46 of the housing 30. The body of the bushing 43 is preferably provided with a plurality of outwardly projecting radial lugs 47 to facilitate screwing this bearing into place on its threads.

The clutch member 35 is normally held clear of the driven clutch member 33 by a coil spring 47, one end of which thrusts against the inner end of the bushing 44, and the other end of which thrusts against a collar 48 that is attached to the actuating shaft 40 by a through pin 49. At the outer end of the neck 46 a stuffing-box 50 with packing is provided, including a gland 51 to tighten up on the packing. The projecting end of the actuating shaft 40 carries a small hand-wheel or knob 52 for rotating the shaft, and this handle or knob may be secured to the shaft in any desired manner. In the present instance, I have illustrated a thread connection 53 for this purpose, and a small set screw 54 mounted radially in the hub of the knob, that thrusts when it is tightened up, against the threads on the actuating shaft 40 to prevent any possibility of this hand-wheel 52 becoming unscrewed.

The clutch members 33 and 35 constitute a one-way clutch capable of imparting torque and rotation to the reel shaft 23 only in the direction that will take up tape on the reel. For this purpose I provide the operating faces of these clutches with abrupt driving faces 55, and with inclined or helical faces 56. As illustrated in Fig. 4, the clutch member 35 is in an ideal position for coupling it up to the clutch member 33 to impart rotation to it when the tester presses against the knob or handle 52, because its abrupt faces 55 are in the proper position to slide or "telescope" over the abrupt faces of the driven clutch member. However, in any oriented position in which the clutch member 35 may be moved into contact with the other clutch member, the helical faces 56 of either clutch member, will contact with the helical faces of the other clutch member, and as soon as the shaft 40 is rotated, these faces will slide along each other until the abrupt faces 55 engage each other, after which rotation will be imparted to the shaft 23. If the man making the test inadvertently rotates the knob 52 in a clockwise direction instead of an anti-clockwise direction as required by the particular general arrangement illustrated, no rotation will be imparted to the clutch member 33. The man making the test, will immediately observe that the torque that he is imparting to the actuating shaft 40, is not being resisted by the weight of the float 2, plus its natural resistance to being lifted above the surface 3 of the liquid in the tank. Hence, the tester will then rotate the knob 52 in the proper direction, and after lifting the float and letting it drop several times a short distance by an operation which may be called "jiggling" the float on the surface, he can ascertain whether the tape is running freely in its guides.

Many other embodiments of the invention may be resorted to without departing from the spirit of the invention.

I claim as my invention:

1. In gauge apparatus for gauging the depth of a liquid or the like, the combination of a gauge line and guides therefor, means for effecting movements of the gauge line corresponding to changes of the liquid level in the tank, a take-up reel carrying coils of the line, capable of rotating to pay out the line, a rotary driving member, and a rotary driven member operatively connected with the reel for rotating the same, said members having a correlated construction constituting a one-way drive to the take-up reel.

2. Gauge apparatus according to claim 1, including means for normally maintaining the said driving member and driven member out of contact with each other.

3. In gauge apparatus for gauging the depth of a liquid or the like, the combination of a gauge line and guides therefor, a float attached to the same, a take-up reel carrying coils of the line, capable of rotating to pay out the line, means associated with the take-up reel for rotating it in a direction to take up slack in the gauge line, a one-way drive clutch for driving said take-up reel, including a driven clutch member operatively connected to the reel for rotating the same, and a driving clutch member having a handle for rotating the same; means for normally holding the driving clutch member out of contact with the driven clutch member; said clutch members having cooperating correlated faces enabling the driving clutch member to drive the driven clutch member in one direction only.

4. Gauge apparatus according to claim 3, including resilient means for normally holding the driving clutch member out of contact with the driven clutch member.

5. In gauge apparatus for gauging the depth of a liquid or the like, the combination of a gauge line and guides therefor, a float attached to the same, a take-up reel carrying coils of the line, capable of rotating to pay out the line, means associated with the take-up reel for rotating it in a direction to take up slack in the gauge line, a one-way drive clutch for driving said take-up reel, including a driven clutch member operatively connected to the reel for rotating the same, and a driving clutch member having a handle for rotating the same; means for normally holding the driving clutch member out of contact with the driven clutch member; said clutch members having abrupt faces and helical faces engaging each other, and cooperating to enable the driving clutch member to drive the driven clutch member in one direction only.

JOSEPH F. LEE.

REFERENCES CITED

The following references are of record in the file of this patent:

UNITED STATES PATENTS

| Number | Name | Date |
|---|---|---|
| 743,125 | Wilkinson | Nov. 3, 1903 |
| 806,494 | Pyott | Dec. 5, 1905 |
| 1,098,189 | Stocker | May 26, 1914 |